United States Patent
Parsons et al.

(10) Patent No.: US 8,341,225 B2
(45) Date of Patent: Dec. 25, 2012

(54) METHOD AND APPARATUS FOR IMPROVED REFERRAL TO RESOURCES AND A RELATED SOCIAL NETWORK

(76) Inventors: Allan Peter Parsons, Bellevue, WA (US); Jordan K. Weisman, Bellevue, WA (US); George Michael Evans, Portland, OR (US)

( * ) Notice: Subject to any disclaimer, the term of this patent is extended or adjusted under 35 U.S.C. 154(b) by 0 days.

(21) Appl. No.: 12/946,718

(22) Filed: Nov. 15, 2010

(65) Prior Publication Data
US 2011/0087734 A1    Apr. 14, 2011

Related U.S. Application Data

(63) Continuation of application No. 11/756,068, filed on May 31, 2007, now abandoned.

(51) Int. Cl.
*G06F 15/16* (2006.01)
*G06Q 99/00* (2006.01)
(52) U.S. Cl. ........................................ 709/205; 705/319
(58) Field of Classification Search .......... 709/204–207; 705/319
See application file for complete search history.

(56) References Cited

U.S. PATENT DOCUMENTS

| | | | |
|---|---|---|---|
| 6,745,178 B1 | 6/2004 | Emens et al. | |
| 7,069,308 B2 | 6/2006 | Abrams | |
| 7,698,380 B1 * | 4/2010 | Amidon et al. | 709/218 |
| 7,730,216 B1 * | 6/2010 | Issa et al. | 709/250 |
| 2002/0065813 A1 | 5/2002 | Scanlon et al. | |
| 2003/0135606 A1 | 7/2003 | Goodwin et al. | |
| 2004/0267706 A1 | 12/2004 | Springer, Sr. et al. | |
| 2005/0027575 A1 | 2/2005 | Amitabh et al. | |
| 2007/0271336 A1 | 11/2007 | Ramaswamy | |
| 2008/0084875 A1 | 4/2008 | Parkkinen et al. | |

* cited by examiner

*Primary Examiner* — Chirag R Patel
(74) *Attorney, Agent, or Firm* — David Wright Tremaine LLP; George C. Rondeau, Jr.

(57) ABSTRACT

A method and apparatus are provided for a user to construct a payload comprising content, such as multimedia, or references to content. The payload may be provided with further elements, such as a title or initial comments. The payload may be sent to any immediate contact of the user. Upon receipt by other users, the payload may be forwarded to any of the others' immediate contacts. Additionally, comments can be made by anyone in receipt of the payload for others in receipt of the payload to view. A social networking mechanism is provided, wherein a record is made for each forwarding of a payload and introductions can be made between individuals lying in the same forwarding chain of a payload. Immediate contacts can be collected into groups for ease in addressing. Teams of users can send and forward messages among themselves or to others outside of the team, according to predetermined rules and individuals' standing within the team. Users are provided with a sortable, filterable list of payloads sent to them. A thumbnail of each payload is provided to allow a user the opportunity to quickly assess the nature of the content. Payloads and invitations to join may be sent to people outside the system via email or as an instant message.

8 Claims, 11 Drawing Sheets

Use the form below to edit your Profile

First Name: _____ 502
Last Name: _____ 504
User Name: _____ 506
Email: _____ 508
Motto: _____ 510
Photo / Avatar: _____ [Browse...] 514
                    512

Preferences 520

Email Notifications ☐ 522
Receive a confirmation alert prior to ignoring ☑ 524

User Profile

[toolbar] 530
[editing area] 532

Social Site Link: none 540
550 [Save]                [add contacts] 560

Figure 5

METHOD AND APPARATUS FOR IMPROVED REFERRAL TO RESOURCES AND A RELATED SOCIAL NETWORK

FIELD OF THE INVENTION

The present invention relates generally to a system and method for providing others with payloads that contain and/or reference information resources, such as multimedia content. More particularly, the invention relates to a system and method for initiating communication with other people on the basis of the payloads that they have indirectly provided to or received from each other.

CROSS REFERENCE TO RELATED APPLICATIONS

Not Applicable.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

The Internet is replete with information resources, multimedia and otherwise. Some are incredibly popular, being visited by millions of visitors per day. Examples include news-centric sites such as Fark.com by Fark.com, LLC of Lexington, Ky. and Digg.com by Digg, Inc. of San Francisco, Calif. which solicit audience references and reaction to news stories; image and streaming video sites, such as Flickr.com by Yahoo! Inc. of Sunnyvale, Calif., and YouTube.com by YouTube, Inc. of San Bruno, Calif.

Social sites, such as Friendster.com by Friendster, Inc. of San Francisco, and LinkedIn.com by LinkedIn Corporation of Palo Alto, Calif., each allow people to contact each other, according to patented rules of engagement.

Personal sites, such as MySpace.com by MySpace, Inc. of Los Angeles, Calif., Facebook.com by Facebook, Inc. of Palo Alto, Calif., encourage a hybrid, wherein the aspects of a content resource site and the interpersonal elements of a social site combine. In each of MySpace and Facebook, enrollees are encouraged to build web pages for others to visit. MySpace emphasizes content as a mechanism to find other people, while FaceBook emphasizes sharing photographs with friends.

Many such social, personal, and information resource sites sustain eager followings that visit such a site one or more times per day. Considering the information and resources they discover valuable not only themselves, but also to their friends and colleagues, these explorers of the Internet are able to copy content, such as the text of a news article, or copy a link, and paste their find into an email. The email can be distributed to a single associate, or to a whole mailing list. Most sites seek to expand their visitorship, and to promote this, provide 'send this article' buttons that provide an already-intrigued site visitor with a tool to send a computer generated email from the site to one or more friends whose email addresses the visitor must provide. Examples include Digg's "Email It" and YouTube's "Send Video", and "Sign In To E-Mail Or Save This" on NewYorkTimes.com by The New York Times Company of New York, N.Y.

There are drawbacks, however.

Email can be clunky to use. Cut-and-pasted links don't always survive the word-wrap of an email reader. Images or formatting of an article don't reliably survive, even if the multimedia email makes it through corporate firewalls and SPAM screens.

Conscientious friends are circumspect about blithely providing their friends' email addresses for website sponsored mailing programs. While high-profile, big-company sites may be generally perceived as trustworthy and not prone to spamming potential customers, the same perceptions may not hold of smaller, lesser known, less established web sites.

Further, even were one to read and trust the privacy policy of one site having valuable content, the situation facing the well-read web denizen is that there are hundreds of such sites that one might visit per week, each with policies that periodically change.

Still more, some sites offer tools such as friends-lists that allow the entry and easy access to those email addresses you use frequently. For exampled, Share2Me by Nextumi, Inc. of Dublin, Ohio.

Some social networking sites, such as implemented in the web site Friendster.com and taught by Abrahms in U.S. Pat. No. 7,069,308, allow enrollees to indicate other individuals with whom they have a personal relationship. Information defining the relationship is processed to reveal the series of social relationships connecting any two individuals within the social network so that the relationship chains between any two individuals can be displayed. In use, a user of the site has access to tools to determine the optimal chain of relationships to reach desired individuals and be introduced (or introduce themselves) and initiate direct communication.

LinkedIn.com by six degrees, inc. of New York, uses a slightly different approach permit those who enroll to enter names and email addresses of friends or colleagues. LinkedIn is an implementation of U.S. Pat. No. 6,175,831, by Weinreich, et al., which teaches an enrollee may define a relationship which may be confirmed or denied by the other member so that all relationships are mutually, reciprocally defined.

However, any one social site is limited by the degree in which it succeeds in attracting enrollees who wish to communicate among themselves regarding content available within the site.

A few sites promote that enrollees (and others) contribute content links to the database. Digg is such a site, and each contributed link is effectively (and numerically) a vote for that content. Thus, content links known to the system have a popularity rank. This is analogous to the page rank used in the significance indexing performed by Google, Inc. of Mountain View, Calif. on their web site Google.com where links by other web pages to a target web page increase the rank of the target web page.

Digg.com also allows enrollees build a profile comprised of contributed links that a list of friends can view or receive as an RSS feed. RSS is a widely used mechanism for subscribing to a source of content.

Digg, however, suffers from the drawback that their content is summarized as brief text extracts, or titles.

Also, as with web sites that attract new visitors to themselves by providing tools to current visitors that generate emails of recommended links, Digg.com provides tools with which an enrollee may email others (enrolled or not) a reference to any content link contributed to the Digg.com site. This has the advantage of not facing the burden or risk of entering friends and colleagues' email addresses on each of many sites, but only a single site.

To a casual user, a drawback of sites which are so strongly rooted in uploading content, as are MySpace and Facebook, is that a vast majority of potential users do not have time or inclination to create content. Still, they would enjoy and benefit from the ability to forward links to content that they know would be of interested to a friend.

None of the above technologies facilitates conveniently expanding one's network of friends on the basis that you like content they've selected. Further, none of these methods facilitates conveniently expanding one's network of friends on the basis that you like content they like.

There remains a need for a social networking site that allows social linking between individuals having a common interest, based on the content they choose to share.

OBJECTS AND SUMMARY OF THE INVENTION

The present invention relates generally to a system and method for providing others with resources, such as multimedia content, or referring others to such resources, as with hypertext links.

In the context of the present invention, a payload comprises content or a reference to content that may be sent to someone else. A payload may further comprise auxiliary elements such as a title or commentary by the sender.

The present invention allows an enrollee to provide a payload and then distribute the payload to specific individuals, to a personally selected group, or to a group defined by both the enrollee and others, herein called a team. In some embodiments of this invention, providing a payload and distributing to individuals, groups, or teams can be accomplished in seconds—far faster than with current methods.

Additionally, the invention permits a recipient of a payload to forward that payload to others. Further, any recipient can comment on the payload for all prior and subsequent recipients of the payload to see. Still further, a recipient may be permitted augment the payload and then forward that payload to others.

The invention also allows the receipt of a payload or viewing of comments about the payload to be limited to members of a group or team, if a predetermined rule to limit such viewed has been established and the payload is sent or forwarded under such rule.

Further, the invention provides a system and method for communicating with other people on the basis of payloads they have provided or forwarded.

It is a goal of the present invention to make social connections on the basis of shared content. The sender of a payload and the chain forwarding is retained and selectably made available to senders and/or recipients so that senders and recipients of a payload can grow their social network by selectably tagging any of those who have shared or commented on the same content. Selectably, the connections a user may access by way of a payload may be limited strictly to senders of the payload in direct line from the user to back to the originator, and/or recipients in direct line from the user by way of subsequent forwards. This can allow an originator access to any recipient of a payload. Alternatively, such access can be provided to any recipient as well. Alternatively, such access can be restricted to only a predefined number of steps; or to a number of forwards such that the recipient population exceeds some predefined threshold.

It is a further goal of the present invention to make such sharing easy, independent of the source of the content.

Another goal of the invention is to allow a central contact database which allows the entry and import of others' contact information, without subsequently requiring the others to become an enrollee in the system.

It is a further goal of the invention to provide a convenient collection point for many kinds of content or references to content, and allow a convenient preview of such content so that browsing can be quickly and efficiently performed.

Yet another goal of the invention is the ability to manage masses of content and references to content provided by others whose 'hit ratio', or ratio of good content to bad content is not high, and thereby provide a means to easily winnow content more likely to be satisfying from that content less likely to be satisfying to the user.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 5 is a sample user interface for creating a user profile;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
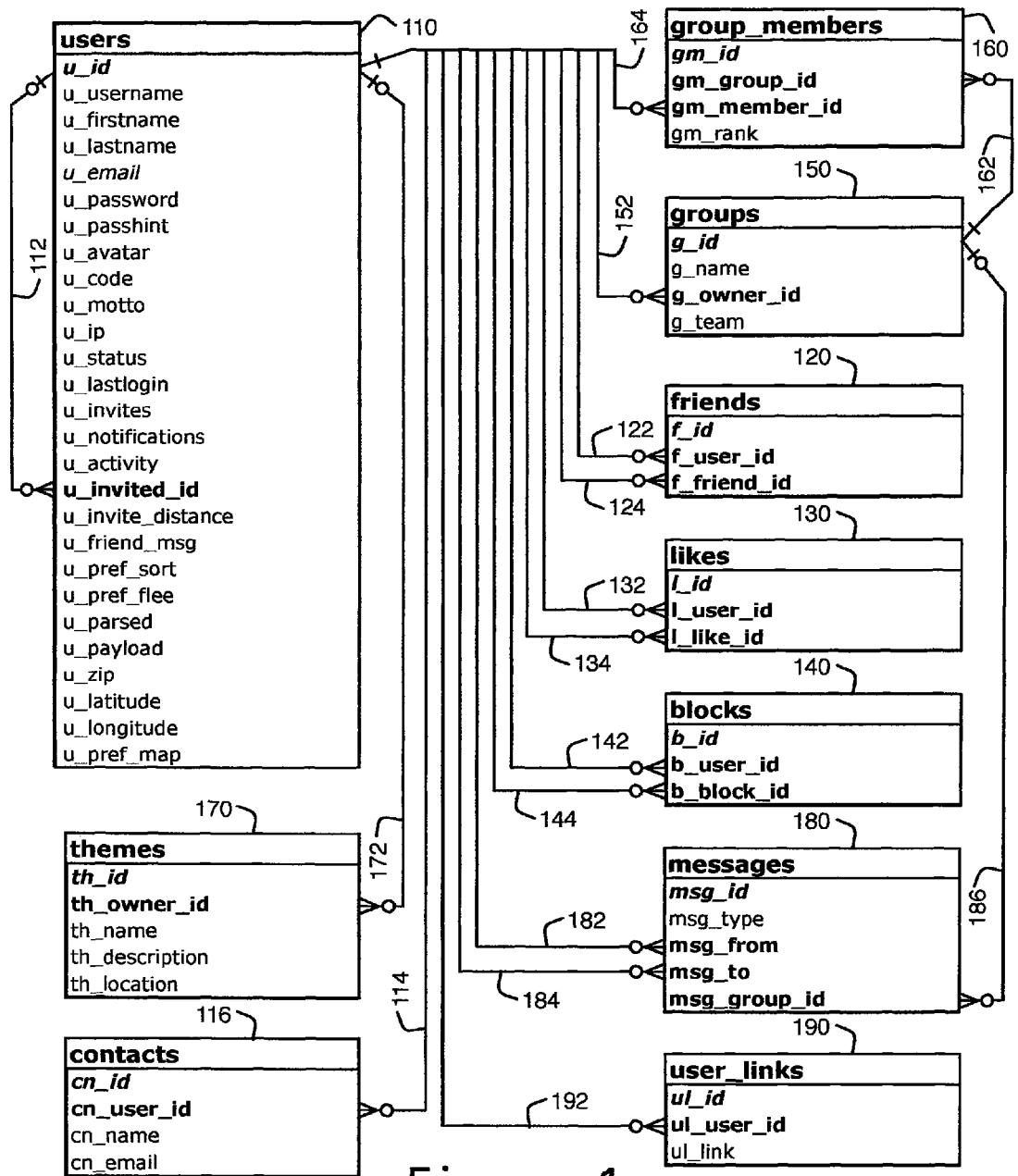
FIG. 1 is a portion of a database schema suitable for implementing the invention, the portion being suitable for defining users and their established relationships.

Referring to FIG. 1, a portion of a database suitable for implementing the present invention is shown. As with any site having user accounts, there is a record for each user account, stored in a table such as that shown in users table 110.

In this exemplary database, the key for records in users table 110 is u_id, and is thus unique. In this and the following figures showing the database, field names within tables that are in italics are unique. Field names that are in bold are either local keys (the first field in the table) or foreign keys, which have a relationship with keys in other tables. Thus, in users table 110, the key field u_is shown in both bold and italics.

Also, throughout this exemplary database, each record contains a field for date created and date modified (neither shown in any of the tables). Such information is useful for detecting aging or idle records, which may be subject to deletion, according to management policies.

For each user, a username or screen name is stored in the u_username field. Usually, such a screen name represents the persona that a user dons when transacting through an account. Real first and last name are preferably stored in u_firstname and u_lastname, and can be used to properly identify the owner of the account, but may or may not be used publicly on the site or in public communications. The field u_email, which is unique, provide a means of contacting the user to whom an account belongs. At the time an account is first created, a random code is created and inserted into the field u_code, and an email disclosing the code is sent to the address in u_email. Once received, the code can be used by the user creating the account to prove that the email address is valid. This ensures that every account has, at least on the date of inception, valid contact information. This helps to limit bogus signups. Other mechanisms, such as providing an image of text that is easy for humans to read, but by design, difficult for machines to read, can help to further reduce bogus signups.

In conjunction with either the u_username or the u_email, a well-chosen password, stored in u_password provides standard security for the account. Preferably, as the password is collected, a hint for the password is too, and stored in u_passhint.

The field u_text contains a rich text markup that the user can supply in the way of introduction or profile that other users may be able to access. Preferably, photographs or other images are used to embellish this presentation closely tied to the account. In u_avatar, a submitted or selected photograph or icon, or a reference thereto, is stored. In the case of no avatar image having been submitted, a default icon is preferably provided.

Common in emails and forums, a user's signature or motto, which typically appears at the end of sent messages, is stored in u_motto. Some users update their motto frequently.

Additionally, a user is preferably able to create a profile for his account, essentially, an "about me" presentation which is preferably available selectably to friends, teams, or everyone. The profile or a reference thereto is stored in the u_profile field, and is preferably a hypertext markup language (HTML) document. For purposes of efficient rendering and thumbnail creation, the profile u_profile is preferably pre-parsed, with the results stored in u_parsed, however the original profile is stored in u_profile for subsequent editing and reparsing.

Since many users may already have accounts on other sites with contact information or profiles, user_links table 190 is provided so that a user may enter any number of such links: each record includes the u_id of the user stored in field ul_user_id, forming a my_link relationship 192. The actual hyperlink is stored in ul_link and can be provided whenever the users profile is displayed to those having an appropriate relationship recorded in the database (e.g., in friends table 120).

In u_ip, the user's current or most recent IP address is stored, as this is useful in security for identifying from where a user is logged in, but also for a form of geo-location as an increasing number of IP addresses can be associated with a geographical area and it is sometimes possible to detect when a user is accessing the site from somewhere other than his normal home or office location.

Preferably, each user supplies a postal code, which is stored in u_zip. With a geo-location lookup of a postal code, this provides information which may represent the hometown location of each users, and may be suggestive the geographical spread of any payloads being exchanged. When the u_zip is set or changes, the geo-location found for the postal code is stored in u_latitude and u_longitude, so that the lookup need not be performed again.

The state of a user, for instance whether the user is online or offline, is kept current in u_status. A companion field to this is u_active, which records the time of the last activity by the user . . . preferably, if more than five minutes ago, the user's status is changed to offline. In u_lastlogin, the date and time when a user was last online is stored. Preferably this date and time is displayed to a user at login, as an aid to detect whether unauthorized users have been accessing an account. Also, the date of the last login can be used to facilitate calculation or measure statistics regarding the frequency with which a user accesses an account.

A number of preferences set by the user are recorded in user table 110: u_notifications flags whether a user wishes to receive email notifications of certain events (i.e., receiving a payload), u_pref_map records the preferred setting on a map display (e.g., center location and zoom) showing the user's location, u_pref_flee is a flag for whether to warn the user before ignoring a payload, and u_pref_sort notes the most recent sort order for received payloads.

Users can send and receive a variety of specific, predefined messages, discussed below. However, the count of certain classes of such messages pertaining to an account can be accumulated here, as an optimization, rather than re-querying the database whenever such a count is needed. For example, the fields u_invites counts outstanding invitations sent to other users proposing friendship.

Most accounts will belong to users who were invited to join by a prior user. For these account, if the invitation is documented, u_invited_id will record the u_id of the inviting user. This relationship is shown in FIG. 1 as optional many-to-one 112. A user may have successfully invited from none to many other users to join, but an account may have at most one u_id noted as the user whose invitation was accepted. This directedness is shown in the notation of the relationship 112. The user's generation, stored in u_invite_distance is equal to the value of one plus the u_invite_distance of the account referenced by the u_invited_id. The fields u_invited_id and u_invite_distance can be used to measure which users have been most successful in inviting other users to join.

Contacts table 116 provides storage for a user's pre-existing lists of friends and contacts from outside the system. These can be bulk loaded into contacts table 116, one record per contact. The u_id of the user loading the contacts is recorded in cn_user_id field of contacts table 116, to form my_contacts relation 114. The contact's name (if provided) is recorded in cn_name, and an email address is stored in field cn_email. Either automatically, or at the user's direction, an email is sent to the contact to invite them to create an account on the system. The email preferably contains a hyperlink that will take them to an account creation page (shown in FIG. 5). Preferably, the hyperlink also include information leading to cn_id or a related value, thus automatically notifying the system of which contact record resulted in this new account. As the account is being created, u_invited_id is set, as described above, to the value in cn_user_id of the related record in contacts table 116.

Various types of communications within the system can set flags, analogous to a blinking light on a telephone answering machine indicating a message awaits. For example, u_friend_msg is a flag that is set whenever a message associated with friends (a relationship discussed below in conjunction with friend table 120 and message table 180) is received. Preferably, the u_friend_msg flag is cleared when the user has taken any action to view those messages.

Friends table 120 forms a many-to-many relationship among users, identifying which users, as far as the system is concerned, are friends of which other users. Each record in friends table 120 lists exactly two users, the first stored in field f_user_id being the user who considers (relation 122) the second, stored in f_friend_id, a friend (relation 124). Preferably, the relationship is maintained as a mutual relationship in the database, and two distinct, reciprocal records are maintained, as this provides a more efficient query when adding or searching for friends. The key of friends table 120 is f_id.

Depending on a user's security settings (not shown but preferably in users table 110), a profile of a user, or a portion thereof, may only be viewed by other users who are designated as friends.

Two users may be marked as friends with a record in friends table 120 automatically, for instance when a first user extends an invitation to create a new account to someone who is not already a user. If the invitation is accepted, that account is marked as having been invited by the first user (see u_invited_id, above), and preferably the two are marked as friends with record in friends table 120.

However, it is a goal of the present invention, to permit individuals to become friends who do not already know each other, in response to content that they share with others through this system. Likes table 130 represents a preferred embodiment for providing this. When viewing content provided by or through a first user, the viewing user is provided with an interface to indicate that the first user is a 'person of interest', i.e., that the content provided by or through the first user resonates with the viewing user and has piqued the viewing user's interest. The viewing user is acting on an impulse of "I might like to get to know this person." The user interface provided to the viewing user (discussed below in conjunction with FIG. 10) creates a record in likes table 130 wherein the viewing user's u_id is placed in l_user_id to form who-is-liking relationship 132 and the first user's u_id is placed in l_like_id to form who-is-liked relationship 134. If it happens to be the case that such a record already exists between these two users, then in the user interface, the first user would already be marked as a 'person of interest' and no duplicate record would be created. Preferably, each time a record is added to likes table 130, a search is made for a reciprocal record. That is, each time an entry is made that you like someone else's content, the system looks to see if that user has registered an interest in any of your content. A majority of the time, such is not the case. However, when the situation is identified, the system provides an introduction between the two users. Preferably, access is granted to each others' profile, and the opportunity to offer friendship is provided through the user interface (as described below in conjunction with messages table 180).

In an alternative embodiment, following the creation of a record in the likes table 130, subsequent reaction by the viewing user to the first user through different pieces of content increments a counter (not shown) in the same record in likes table 130. A policy may be put in place that one or both users in a reciprocal likes relationship must have identified a predetermined number of pieces of content of each other's before an introduction is made.

In still another embodiment, content might not be attributed as having come from or through any specific users (other than those with whom a relationship is already established, e.g., friends) until the viewing user has indicated whether the content is interesting or not, preferably on other than a binary scale. In this way, records in likes table 130 can be rapidly generated without pre-biasing the viewing user to a piece of content because of an observable source.

In still another embodiment, a variation of likes table 130 relates the viewing user to a piece of content, rather than a user it came from or through. Those skilled in the art may recognize that, depending on usage statistics of the likes feature, the number of users who forward content to others, and the policy of who in a chain of forwarded content can be tagged as a person of interest; an economy of storage may result by instead recording which content a user likes, and allowing an automatic process to run in the background, automatically searching for 'persons of interest', which (per policy) may be introduced if the interest is reciprocal (or not, per policy), or the system may automatically promote a ranking of content from or through users whose content you have appreciated in the past.

Records in likes table 130 having a creation date or modified date (neither shown) older than a predetermined value, may be subject to deletion according to policy. This allows a cleanup of records of a 'one-hit wonders' character, where someone who happened to forward one article you found interested, but in the longer run turned out to not warrant retaining a record of that event indefinitely.

Blocks table 140 represents the opposite reaction of the viewing user to the first user. If a piece of content is offensive, or merely of sufficiently poor quality, the viewing user may opt to block the first user. A record is entered into blocks table 140 with the viewing users u_id in field b_user_id to form blocking relation 142, and the first user's u_id in b_block_id to form blocked relation 144. Once blocked, content originated or forwarded by the blocked user will not be received by the blocking user.

In an alternative embodiment, the system may differentiate between originators and forwarders for the purposes of blocking, or a record in blocks table 140 may have a block_type (not shown) which implements a more selective block against content having specific properties (e.g., from certain sites, having certain words or topics, etc.)

As a matter of policy, a block may be overridden by other relationships. For instance, if a payload being forwarded to a user causes a block to be triggered, as when the u_id of a forwarding user of the payload is in the b_block_id field of a record in blocks table 140 having the user's u_id in the b_user_id field; the payload may be delivered to the user anyway, for example, when the originator of the payload is already identified in record in the likes table 130 as being liked by the user. Well known in the art is the construction of queries which can produce such results, given a database such as the one shown here.

Figure 4:
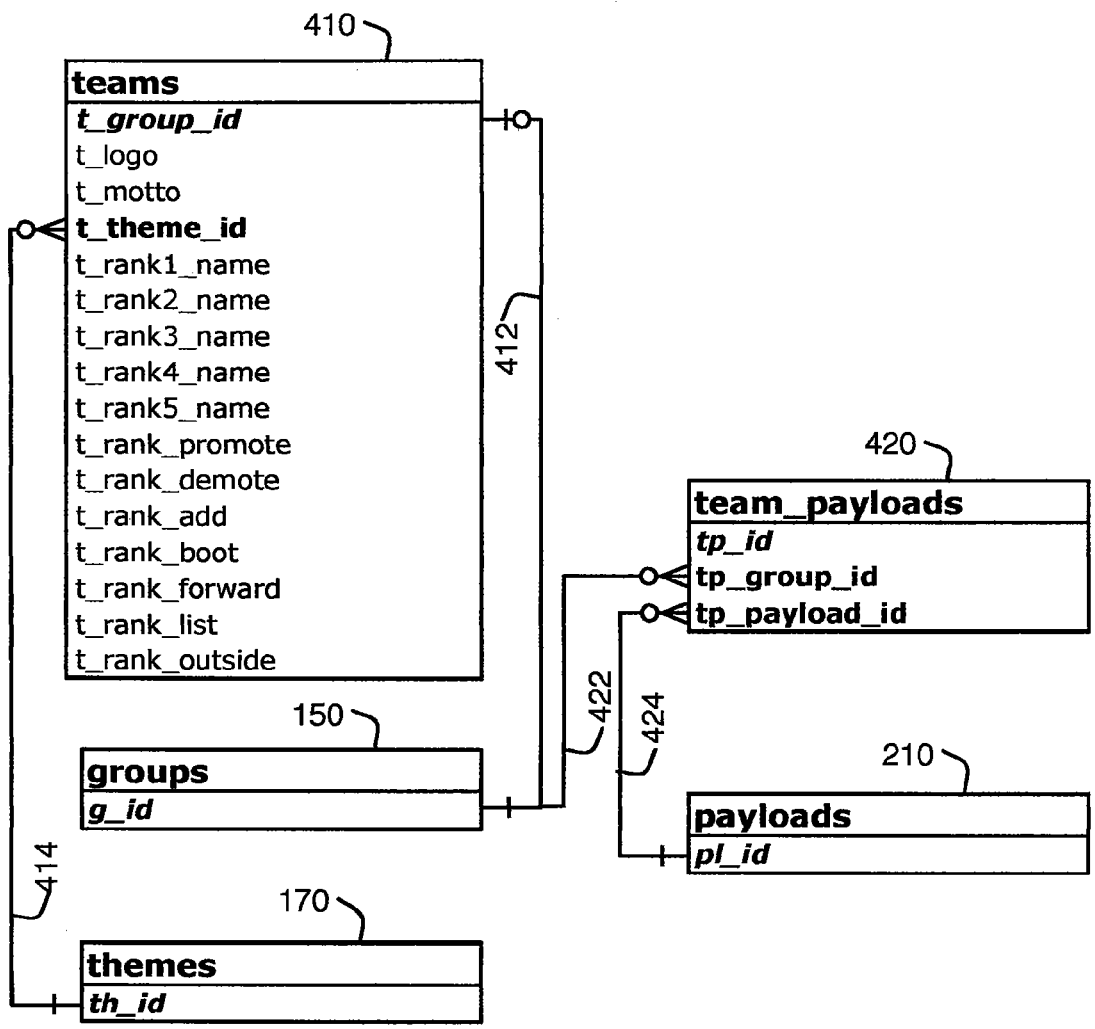
FIG. 4 is a portion of the database schema defining teams, their membership, and payloads owned by teams.

Turning now to groups table 150 and group_members table 160, a group is a list of users. Usually, a group is created by a user to make sending less burdensome. A group is initially formed as a record in groups table 150. Each group is uniquely identified with the g_id field. The creator of the group is the owner, a user whose u_id is stored in g_owner_id forming ownership relation 152. Preferably, the user also names the group, the name being stored in g_name, so that a user that owns multiple groups can easily differentiate among them. The g_team field is a flag used to extend the functionality of a group, which is explained below in conjunction with FIG. 4.

Once the group record is established, records in group_members table 160 are added. Records in this table 160 form a many-to-many relationship between users and groups. Each record in group_members table 160 identify a group in gm_group_id forming the group_membership relation 162, and gm_member_id contains a u_id, forming member relationship 164. (gm_rank is discussed in conjunction with FIG. 4).

Once a user has created a group and populated the group with members of the user's friends, the user can enjoy a more convenient means for directing communication. Note that this definition and implementation of groups does not, in and of itself, grow a user's social circle. However, the elaborations discussed below in conjunction with FIG. 4 alter this.

Messages table 180 includes records representing a number of specific, predefined messages within the system. Each message is from a particular user, whose u_id is entered in field msg_from to form sender relationship 182. A individual user may be designated with a u_id in field msg_to to for recipient relation 184. In the case of a message concerning a team, a corresponding group may be referenced in field msg_group_id to create team reference 186. The precise meaning of each message is contained in the msg_type, which is simply a numeric value representing the meaning. The actual text of the message as shown to the recipient, is preferably provided from a separate lookup table (not shown), which may also provide different text for the message on the basis of a language of preference in the recipient's account (field u_language in users table 110, not shown).

Preferably, the following message types are provided for the identified situations or purposes:
1) friend invite (sent following type 5 or 15)
2) friend invite pending (a reminder after type 1)
3) team invite (sent to friends)
4) team invite pending (a reminder after type 3)
5) mutual interest (a notice identifying mutual like)
6) friend invite accept (a response to type 1)
7) friend invite reject (a response to type 1)
8) team invite accept (a response to type 3)
9) team invite reject (a response to type 3)
10) friend invite withdraw (retracting type 1)
11) team invite withdraw (retracting type 3)
12) withdraw person of interest (a response to type 5)
13) friend boot (when deleting a friend relationship)
14) team boot (when deleting a member relationship)
15) contact join (when a new user joins following your invitation . . . offering the opportunity to send type 1)

Finally, each user has access to one or more 'themes', visual style, with which the look of the site, messages, and payloads are interpreted. Themes are preferably implemented as a Cascading Style Sheet (CSS) well known in the art. Each record in the theme table contains a name (th_name) and description (th_description) fields to aid selection by the user. The field th_location is preferably a URL for the CSS. If the CSS is created or owned by a user, the th_owner_id field is set to the u_id creating owner relationship 172. A most recent or preferred theme may be stored as a preference in users 110 (field u_pref_theme, not shown).

Figure 2:
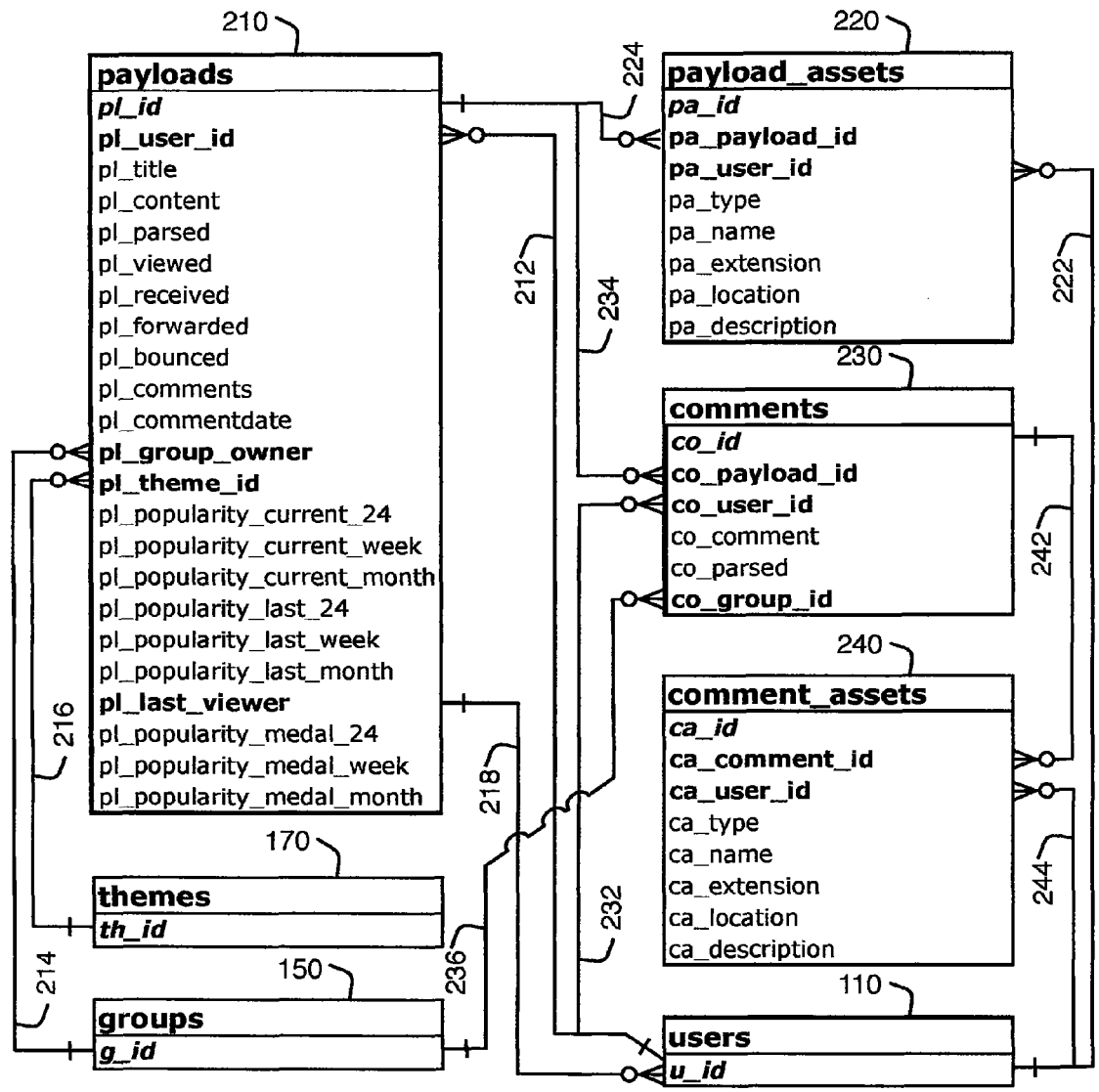
FIG. 2 is a portion of the database schema for defining payloads, comments about payloads, and their relationships to users.

Referring now to FIG. 2, a portion of the database that describes the payload is shown. Each payload, upon creation is assigned a unique pl_id. The creator of a payload is stored in field pl_user_id, which establishes the originator relationship 212 with a user in users table 110.

Payloads table 210 is the repository for the baseline data the payload comprises. The payload title is text kept in pl_title. The content is preferably stored in pl_content either as an HTML document, or as a URL to one. Preferably, the content is pre-parsed at the time it is entered (as shown below in conjunction with FIG. 6), for efficiency in later display. However, the original content is retained and accessed through pl_content in case of subsequent editing.

A number of fields in payloads table 210 track counts of specific events relative to each payload. The fields pl_received, pl_viewed, pl_forwarded, pl_bounced, and pl_comments respectively track how many users have received, viewed, forwarded, bounced, or left comments regarding the payload (discussed below and later, in conjunction with FIG. 3).

A date or time associated with the most recent comment is preferably stored in pl_commentdate. This field can be compared to the last time the author or viewer of a payload looked at the payload, to discern if there are new comments since the last visit. Also, a policy can examine pl_commentdate to determine if there has been no significant interest in the payload for a period, possibly representing a payload that could be culled from the database.

If a payload is to be subject to rules or policies associated with a team (discussed in conjunction with FIG. 4, below), the field pl_group_owner of payloads table 210 will contain a g_id referencing a record in groups table 150, forming group_ownership relation 214.

The CSS used for display of a payload is assigned by the user by selecting a record from theme table 170 and recording the th_id in pl_theme_id to create with-theme relationship 216. Alternatively, a default theme is used.

The popularity of a payload may be a score based on a combination of fields such as pl_received, pl_viewed, pl_forwarded, pl_bounced, and pl_comments. For example, a calculation of popularity might be absolute: how many times was this payload forwarded? A payload that is forwarded to ten thousand people is presumed then to be more popular than a payload forwarded to dozens of people.

Preferably, a weighted combination of such counts can be used to determine a popularity score. For example, a view might count two points, a comment three, and a forward five. Additionally, one might count a bounce as a negative two points.

Alternatively, among users to whom the payload was sent, an average reaction can be calculated on a scale of −1 to +1 by computing (pl_forward−pl_bounced)/pl_received. If everyone who received the payload has forwarded it, then (100%−0%)/100%=100% of the recipients are deemed to have liked it, and a score of +1 is earned. If everyone who received the payload bounces it (i.e., discards it), a score of −1 is calculated. If half the recipient forward it, and half bounce it, the score is 0-neutral. The same score is achieved if of the recipients, nobody forwards and nobody bounces it. This gauges the relative reaction of users to whom a payload is sent, whereas the popularity is gauged on an open-ended scale.

Popularity as measured and calculated above, in the sense of being cumulative, is analogous to total sales for a record. However, in a differential sense, more analogous to weekly record sales, high popularity is a transient phenomenon. A recently released payload is read and forwarded to many people, and they forward it and so on. The fast the payload is forwarded and to more people, the greater the difference between yesterday's popularity score and today's. But jump forward a month. Everyone has read it. Everyone has forwarded it. Nobody is reading it again. The difference in cumulative forwards (or weighted total counts, as above) from day to day is comparatively small. This payload is no longer hot, as it once was.

To track this transient popularity, the cumulative popularity (preferably the weighted sum, as described above) is recorded on each anniversary of the payload's inception, for instance, every day, week, and month. Thus, every 24 hours after the payload is created, the total sum is written into pl_popularity_current_24. If the current day-of-the-week is the same as when the payload was created, this same total value is written into pl_popularity_current_week. Whenever the day-of-the-month matches that of the inception (or on the last day of the month if the anniversary day of the month is the 29th, 30th, or 31st and the current month has fewer days) then this same total value is written into pl_popularity_current_month.

If a previously recorded value is already present, that value is copied into pl_popularity_last_24, pl_popularity_last_week, or pl_popularity_last_month, respectively.

Once the anniversary calculations have been run for a given date, the differential popularity is calculated by subtracting the last popularity values from the current popularity values (separately for each of day/week/month). The result, over all payloads, can be expressed as a histogram (not shown) and a calculation made to determine the deciles (again, for each of day/week/month).

Each payload's differential popularity for the day/week/month will place it in a different one of the ten deciles, which can be recorded in each of pl_popularity_decile_24, pl_popularity_decile_week, and pl_popularity_decile_month.

A user may choose several views of received payloads. Differential popularity is a good basis for a sort—putting the most popular payloads for today, this week, or this month toward the top of the list. When using any other sort, the record of the popularity decile can be used to mark a representation of the payload in the list with an icon suggesting the decile of popularity.

Many alternatives to this scoring system are possible. Peak differential popularity might be recorded, for instance, to track the fastest spreading payloads of all time. A special calculation may be made to determine and corresponding icon provided to mark payloads in the top 1% or top 0.1%, or other similarly rarified achievements.

Further, payloads made be subject to categorization, for example all payloads belonging to a team (discussed below), or payloads containing certain search terms. In such an embodiment, when viewing by category, payloads may bear the markings of their decile (or other rank) when measured against other payloads within the category. In this way, payloads associated with a category having a modest following, when viewed by users concerned with the category, are ranked among themselves, i.e., within the category. Otherwise, payloads representing a category of modest interest might all receive 'bottom decile' ranking with little differentiation among them, rendering rankings with a category of little value.

Lastly in payloads table 210, pl_last_viewer is a frequently updating field retaining the u_id of the most recent user to have newly viewed (discussed below with respect to FIG. 3) the payload, creating last relationship 218. While offering fleeting fame for a user if displayed along with various presentations of payload lists or payload details, this information is also useful for awarding 'thousandth viewer' or such awards.

The pl_last_viewer field may also be used as an social mechanism by allowing one person currently viewing a payload of interest to initiate a discussion with another person—even if anonymously—who happens to find the same content to be of interest. While viewing a piece of content, if pl_last_viewer is not you, and pl_last_viewer is online, the system could offer the opportunity send comments on the content to the other substantially current viewer, who may or may not choose to reply. Such an exchange of comments might be sufficient to permit either to mark the other as a person of interest, as discussed above, even if the two are not related by a line of transmittal in the history of the payload.

Often, the HTML (or other content) which pl_content provides may reference other assets, such as when the pl_content includes a reference to an image, audio track, or other multimedia resource. In such a case, the image or other asset can be tracked in payload_assets table 220.

Each entry in payload_assets table 220 preferably stores the pl_id of the payload using it in field pa_payload_id, to create asset_used_by_payload relation 224. Also, the u_id of the user adding the asset is stored in field pa_user_id, creating payload_asset_owner relation 222. Each asset is noted as to its type, in pa_type. Preferably the user is prompted for a name and description of the asset, stored in pa_name and pa_description, respectively. If the asset has a file extension, this is recorded in pa_extension. The pa_type and pa_extension provide hints to the system for rendering the asset when displaying the payload of relation 224, but also to provide hints for a user searching among assets that have been entered into the database previously. For instance, if a user makes frequent use of a particular icon as he composes payloads, then a listing of pa_type=icon, sorted by pa_name is an effective tool for selecting the icon.

The URL or other record of the asset location is recorded in pa_location. This permits the asset to be loaded onto the system of the present invention, or to be hosted by some other server, such as one operated by or for the user, or, for example, on the server hosting the main content to which the creator of the payload identified by relation 224 is directing the attention of others by means of the payload.

Once a payload is created, recipients are preferably able to comment on the payload. Their comments are preferably recorded separately from the payload, but remain associated with the payload through comment_on_payload relation 234, which links a comment stored in comments table 230 to the corresponding payload by storing the pl_id of the payload in field co_payload_id of the comment record. The u_id of the user making the comment is stored in co_user_id, forming comment maker relationship 232. If the comment is to be restricted to a team or subject to specific rules governing the comments made within a team, then the g_id associated with the team and it's corresponding group (see the discussion below in conjunction with FIG. 4) is stored in co_group_id, forming group_comment relation 236. The comment as provided by the user is stored in co_comment.

As with pl_comment in payload table 210 and u_payload in users table 110, the comment is preferably HTML (or a reference thereto). As such, the comment as provided can be parsed and the results stored in co_parsed field of comments table 240 to be ready for more efficient rendering or inclusion in a display of a payload.

In the same way as records in payload_assets table 220 are provided for and related to records in payloads table 210, so comment_assets table 240 provides a record, for example of images, that are related to comments table 230. In field ca_comment_id, the co_id of the corresponding comment is stored, forming asset_used_by_comment relation 242. The u_id stored in ca_user_id forms comment_asset_owner relation 244.

Figure 3:
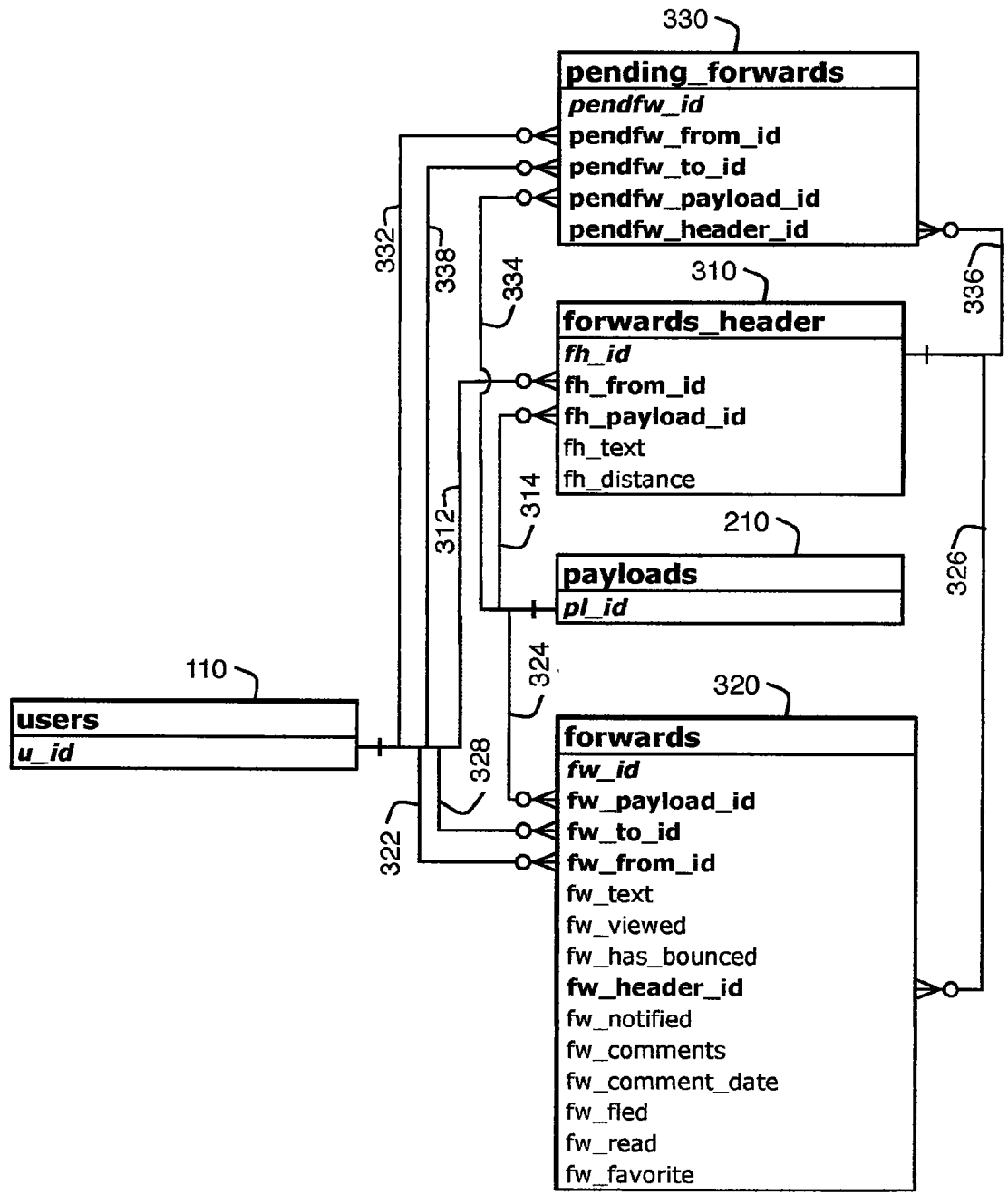
FIG. 3 is a portion of the database schema for defining and tracking the sending and forwarding of payloads.

In conjunction with FIG. 3, the records and relationships associated with the forwarding of payloads are shown.

As a user prepares to send a payload to one or more other users, a record in forwards_header table 310 is created. The u_id associated with the user's account is inserted in field fh_from_id, to establish header_from relation 312. This applies both to a user sending a newly created payload, or transmitting a payload received from others. The pl_id of the associated payload is stored in fh_payload_id to form header_for_payload relation 314. Additionally, a forwards_header may contain a title or brief comment stored in the fh_text field.

As a sending user identifies each intended recipient, a record in forwards table 320 is created. Each forward record ties to the sender's corresponding forwards_header through forward_header relation 326. For a given sending user, there is preferably only one record in forwards_header 310 for a given payload. However, in an alternative embodiment, this need not be a requirement.

Each record in forwards table 320 includes copies fw_payload_id (forming forward_payload relation 324), fw_from_id (forming forward_from relation 322), and fw_text made of the corresponding fields from the corresponding forwards_header). Additionally, each has a recipient u_id, forming forward_to relationship 328 recorded in field fw_to_id. With that, there is sufficient information for transmitting to the recipient the corresponding payload. Preferably, however, the records in forwards table 320 also track the status and results of that transmission.

Each forward also includes fw_viewed, a flag to indicate that the corresponding transmittal (not the payload) has been viewed by the corresponding recipient. If a user's account preferences include a setting that notifications of newly received payloads is desired, then such notification is generated and the fw_notified flag is set so that the notification isn't duplicated. If the recipient actually selects the payload for viewing, then the fw_read flag is also set. If the recipient marks the payload as a favorite, then the fw_favorite flag is set. In the case that a designated recipient has established a block (see the discussion related to blocks table 410), then the transmittal is cancelled, and the fw_has_bounced flag is set.

Preferably, the recipient is offered the opportunity to reply to the sender directly (and in a manner other than in the public forums), such a reply is stored in fw_comments along with a current timestamp in fw_comment_date. Such reply are preferably visible only to the sender. In an alternative embodiment, the only mechanism presented for a recipient to reply is in the public forum produced by records in comments table 230.

Referring back to forwards_header table 100, preferably, an fh_distance field in forwards_header table 310 counts the number of hops, or transmissions, from the originator of a payload to the current sender. This is another mechanism for accumulating statistics about the payload and its popularity. When the user is the original sender of the payload, then the fh_distance is initialized to 0. However, if the sender is forwarding the payload, then forward_header relation 326 is followed back to the forwards_header created by the prior sender, and the fh_distance field found is incremented by one and used in the current forwards header. Additionally, a payload, when created, could be given a forward limit (not shown). A forward limit would disallow a payload from being forwarded when the fh_distance field exceeds the forward limit. Alternatively, a forward limit may be imposed a global value for all payloads. Or such a forward limit may be specified for members of a team (discussed in detail below) having at least a certain rank to allow limited dissemination of team payloads outside of the team (and some higher-ranked team members might have a higher or no forward limit).

In an alternative embodiment, the fh_distance can contain an actual estimate of distance traveled by the payload to the current recipient by instead incrementing the fh_distance from the prior forwards_header by a distance estimated from the separation of the prior sender's and current sender's geographic locations (u_latitude and u_longitude from users table 110).

In the case that a user has invited an individual to join the system by supplying their name and email address, a tentative account is created in users table 110 and an invitation is sent by email. Alternatively, an instant messaging (IM) address or other communication address (none shown) can be provided, recorded, and the invitation sent there. As mentioned above, the communication can include a confirmation code, stored in the u_code field of users table 110 in the record of the temporary account. The name supplied by the inviting user may be stored in u_firstname and u_lastname, but may be changed by the invitee when responding to the invitation. Until then, the u_status value would be 'invited'.

Even in the case where a candidate member has the status of 'invited', it can be desirable for the user having invited the candidate to be able to forward payloads to the candidate and a variety of methods are contemplated by this invention to accommodate this. In particular, the ability to forward payloads to invited members is desirable so that as soon as the invitee responds, there can be a collection of payloads awaiting perusal. As a matter of economy, and to keep more accurate counts of payload transmittal statistics, it is preferable that a payload addressed to an account having the status 'invited' does not result in a record in forwards table 320 being generated, though some other statistic, not shown, might express this. Instead, a transmittal by the inviting user (who is initially going to be the new user's only friend), addressed to the new user, results in the creation of a record in pending_forwards table 330, which relates the sending user (in pendfw_from_id and relation 332), invitee (in pendfw_to_id and relation 338), the payload being sent (in pendfw_payload_id and relation 334) and the header (in pendfw_header_id and relation 336).

At the time an invitee responds to an invitation and the corresponding account status first transitions to a status of online, any pending_forwards tied to the account with relation 338 are converted into records in forwards table 320 by copying the corresponding to, from, payload, and header ID fields from the pending_forwards record into a new forwards record. Once the information is copied, the pending_forwards record can be deleted. At the time the new forwards record is created, the transmittal is correctly reflected in counts used to measure payload popularity statistics.

In the simplest implementation, a group, as represented in groups table 150, is an aid to a user allowing an ability to address a number of friends by merely selecting the group. An extended implementation allows the group mechanism to be extended to create a team (or club, etc.) wherein each member of the team is a friend of at least one other member of the team, and there is a linkage of friends between any two members.

Each record in teams table 410 is essentially an extension of a record in groups table 150, linked by team_record_for_group relation 412 where the t_group_id field is associated with the g_id of a particular group. In such a case, the g_team field of the corresponding record in groups table 150 is set to TRUE to indicate that the group is a team. The g_name field now represents the team name. In teams table 410, the team preferably has a logo, a reference to which is stored in field t_logo, and a motto, stored in field t_motto. Further, team-related communications (especially payloads) may be rendered in a style dictated by a theme (e.g., a CSS) as noted in t_theme_id and forming team theme relation 414.

Preferably, each team has a collection of policies that allow the members of the team to manage the team's membership and policies for communication between themselves and the outside.

An exemplary implementation of team management policies is to grant to individual members of the team varying capabilities, depending upon their degree of authority within the team. One implementation that provides an assignment of authority is the notion of rank, where certain capabilities are available to any user that is a team member, and within the team holds a certain rank. A user's rank on a team is recorded in the gm_rank field of the record in group_members table 160 corresponding to the team of group_membership relation 162 and having a member_relation 164 with their account in users table 110. To help develop the character of a team, each rank can have a name (such as would be stored in fields t_rank1_name through t_rank5_name). A list of actions related to team operations is provided by the system, with the authority to perform each action being conveyed only to those members having a sufficient rank, preferably as stored in the database and able to be configured at least at the time the team is created. As an example, a newly joining member of the team might be provided with a rank of one. The founder of the team might be provided with a rank of five (i.e., the maximum rank). As a matter of policy stored in teams table 410, t_rank_promote might be three, indicating that those members having a gm_rank of three or more can promote those having a rank less than theirs to the next higher rank. Similarly, t_rank_demote might indicate the rank at which a member may choose to demote another member having a lesser rank to a rank one lower. Alternatively, t_rank_demote might indicate the rank at which a predetermined number of members could collectively demote another member of their own rank. Field t_rank_add and t_rank_boot preferably indicate the ranks at which a member can add members to or eject lower ranked members from the group. The field t_rank_list is the rank at which a group member can list the other members. Alternatively, it might only allow the member to list those at the same rank or lower (or, only strictly those of lower rank).

Teams provide an additional mechanism for sending payloads to others. Specifically, a sufficiently ranked member of a team can send a payload to all the other members of a team. For this preferred embodiment, the t_rank_forward is the rank at which a member must be in order to send such payloads. Such a team payload is annotated by records in team_payloads table 420. The group with which the payload is associated is stored in field tp_group_id to form payload of group relation 422, and the pl_id of the payload is stored in field tp_payload_id field to form owned_payload relation 424. In this manner, a user joining a team more recently may still have access to the history of team-owned payloads.

Generally, it is preferred that a team-owned payload is not available to be sent outside the team. However, if such a capability is to be allowed, t_rank_outside can be used to denote at what rank a group member is allowed to pass team payloads to users outside of the team.

There are several implementation details related to forwarding of team-owned payloads. In the preferred embodiment, the original payload can be forwarded to a non-team member user, but in accessing the payload, the query will recognize that the non-team member recipient is not entitled to view the comments associated with the team-owned payload.

In an alternative embodiment, as a team-owned payload is forwarded outside of the team, a duplicate copy of the payload and payload asset records may be made, however, any comments related to the payload are not duplicated or associated with the forwarded version. Thus, while the original payload is forwarded, the comments made by team members in the privacy of the team environment are not subject to forwarding outside the team.

In still another embodiment, whether forwarding a payload outside the team will include comments or not may be a matter of the team configuration, and recorded in teams table 410 (field not shown).

Referring now to FIG. 5, an exemplary user registration interface 500 is shown. Data elements useful or required for constructing a record in users table 110 are solicited, including First Name 502 for u_firstname, Last Name 504 for u_lastname, User Name 506 for u_username (which is preferably unique in table 110 to avoid confusion of accounts), an email address 508 for u_email (also preferably unique), a motto 510 for u_motto, and an image file for an avatar 514 which is to be uploaded and subsequently referenced by u_avatar.

In addition, preferences 520 may be collected at this time, for example, an election to received email notifications 522 of messages or payloads stored in u_notifications. Other such preferences a previously described may be collected, or others may be included, for example, whether or not the system requires a confirmation before ignoring a payload 524 (no corresponding field shown in table 110).

Alternatively, flags such as email notifications 522 and receive a confirmation 524 may be collected as bits in a larger multi-bit word, and the resulting value stored in a field such as u_notifications.

Multimedia edit frame 530 provides editing tools for a user to enter hypertext into edit field 532. A preferred implementation of such a multimedia edit frame 530 is provided by the FCKeditor by Frederico Caldeira Knabben seemingly of Rome, Italy and available through his website, www.fckeditor.net. The various controls in edit frame 530 allow changing of fonts, including their style, typeface (font), size; indenting, numbering or bulleting, and the inclusion of images, or other multimedia objects. Multimedia edit frames are preferably provided throughout the interface, wherever the user is prompted to enter information that will be presented to others. In this case, hypertext representing the user's entry is stored in u_payload. Any multimedia, for example images, that are referenced on an external server or uploaded are identified within the stored hypertext by an appropriate URL. Subsequently, if the user chooses to edit this presentation, the u_payload field is available to be edited. However, once entered, the u_payload field is preferably pre-processed into a form ready for inclusion in a web page presented by the site. This prepared form is stored in field u_parsed.

One or more prompts for a social site link 540 may be provided, to populate user_links table 190 with records associated with the user through my_link relationship 192.

Finally, save button 550 preferably executes a check that the data in form 500 meets appropriate requirements for completeness and uniqueness. If not, an appropriate message is displayed to the user requesting the data at issue to be completed or corrected. If all the data is acceptable, the information is inserted into the appropriate fields of a new record in table 110 and, if any social links were entered, corresponding records in user_links table 190.

As with most social networking sites, an add contacts button 560 or the like is provided. This opens an new contacts interface page (not shown) where the user can enter names (cn_name) and email addresses (cn_email) for new contact records in contacts table 116. Preferably, an email is automatically sent to each such contact inviting them to join the site of the present invention.

Alternatively, the invitation can be explicitly sent by the inviting user. Preferably, the new contacts interface page includes a capability for uploading a list of contacts, for example from an email program's address book or the contact list from the user's account on another social networking site (which typically requires the user's name and password on the other site). As described above in conjunction with users table 110, the invitation to join preferably contains a link to the site that includes a code, that same code being stored in u_code field of the candidate user to verify the respondent is the candidate to whom the invitation was sent.

Figure 6:
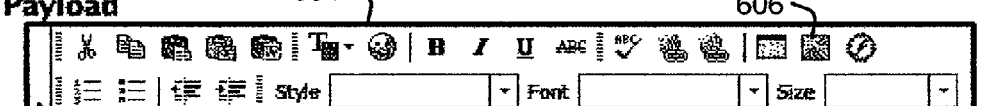
FIG. 6 is a sample user interface for creating a payload and sending the payload to other users.

FIG. 6 shows an exemplary payload creation user interface 600. When complete, a new payload results in a corresponding record in payloads table 210. The creating user is recorded in pl_user_id. A title for the payload is entered by the user into title 602 and recorded in pl_title. The heart of the payload is constructed using the tools of multimedia edit frame 604, such as image entry button 606. The user enters hypertext into edit field 608 and may use the edit tools to embellish it, in a manner similar to edit frame 530. As before, the entered hypertext is stored in directly into a field, pl_content, and can subsequently be re-edited, but a pre-parsed version suitable for quick inclusion in a web page is stored in pl_parsed. A note 610 may be entered, and used as described below when sending.

The choice of a 'theme' is preferably offered by theme selector 612, which provides a reference to a cascading style sheet (CSS) or other mechanism to control color scheme, background textures, etc. so that the elaboration of design details is less of a burden on the user, yet the user's hypertext entries can still achieve a consistent and high aesthetic level.

Friends list 620 is preferably a checklist of those users having a friend relationship with the user creating the payload. These would be those users with whom the author shares records in the friends table 120. Such records are well-known in the art to be created either when a contact of record supplied by the user in contacts table 116 responds by signing up as a user (e.g., with registration form 500), or by providing prima facie evidence of friendship, specifically, the other user's email address.

Groups list 630 contains another checklist of named groups into which the user has collected friends, or teams which the user created or has joined.

In both cases of friends list 620 and groups list 630, a check indicates that the payload is to be sent to the corresponding users. Preferably, users who have already received the payload are displayed grayed and cannot be sent the payload again. This will not be the case if the payload is newly created, but will occur if the creating user revisits the payload to send it to more users, or when a similar interface is used by a recipient of the payload to forward the payload with or without comments to another user as discussed below.

Figure 7:
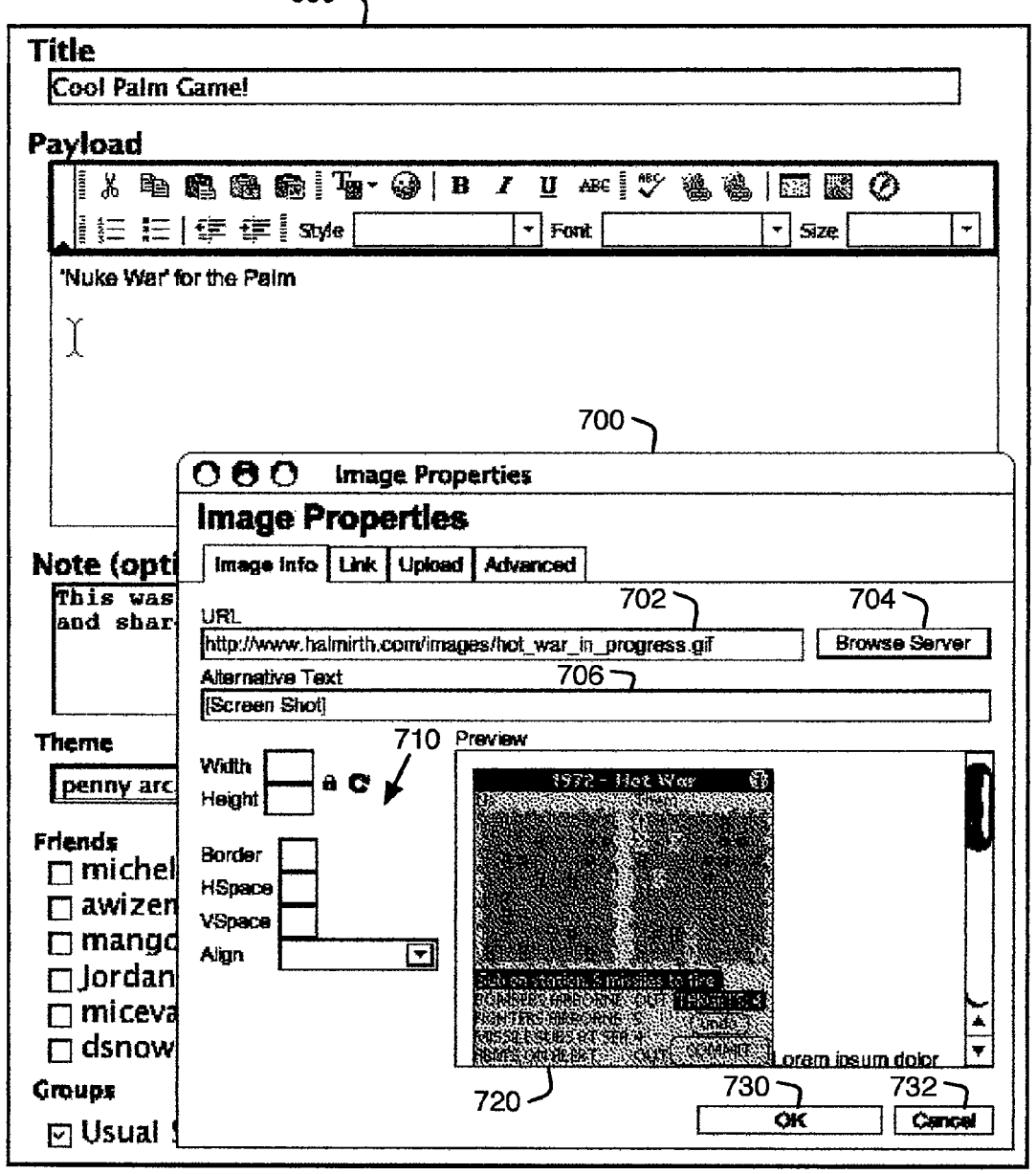
FIG. 7 is a sample user interface for adding additional content or references to the payload.

As an example, if 'insert picture' button 606 is pressed, the user is presented with image properties dialog 700, as shown in FIG. 7. The dialog 700, would be similar for other types of multimedia asset, for instance streaming video or Flash animations (a trademarked multiplatform presentation programming language by Adobe Systems, of San Jose, Calif.). The image may be identified by a link 702, which may reference an image available externally on the web, or it may reference an image previously uploaded onto this site's server, in which case browse button 704 allows the user to select from those images, or from an image library. Such an entry is preferably noted in payload_assets table 220. Though not required, this allows for easier identification of hypertext linked assets within the edit field 608, and allows references to them to be edited atomically, rather than permitting inadvertent subtle damage to the hypertext link. Common in web presentations, especially for cell phone interfaces or for browsers not able or not configured to display certain classes of content, an alternative text 706 entry may be provided. Any of the size or position parameters 710 can be manually set, but if not, reasonable defaults (such as actual width and height) are provided automatically. An illustration 720 of how the image will look including its position with respect to surrounding text represented by greeked placeholder text.

When the user is satisfied with the selection and format of the asset as shown in illustration 720, the OK button 730 is pressed. The cancel button 732 aborts the insertion of the multimedia asset.

The user is also free to insert hypertext links by typing or pasting them directly into payload edit box 608, but such tools as those represented in FIG. 7 make the process less troublesome, and the result is generally more refined than most users can achieve by manual entry.

Once the payload author has created a new payload using payload creation form 600, preview button 640 may be pressed to preview the payload, or send button 650 may be pressed to send the payload to those users and groups indicated in recipient checklists 620 and 630.

When send button 650 is pressed, a new record is created in forwards_header table 310. The sender's u_id is stored in field fh_from_id, and the payload's pl_id is stored in fh_payload_id to form header_from relation 312 and header_for_payload relation 314, respectively. A note 610, if any, is stored in fh_text. If the payload is a new one, fh_distance is set to zero, otherwise it is incremented from the header which was attached to the payload when received.

For each individual user recipient, a new record in forwards table 320 is created. In one embodiment, the same is true for each individual user in any group, including members of teams.

In an alternative embodiment, groups or just special groups such as teams, may be treated differently, wherein a single forward record having a relationship to the group (not shown) is created. The nature of a group_forward table (not shown) or the addition of a fw_to_group_id field (not shown) to the forwards table 320 and the corresponding relationships to support such a record and the associated queries is well within ordinary skill in the art. By such an arrangement, a new member of a group is able to access the history of payloads sent to the group. Further, the degree to which a member of a team is able to 'look back in time' at payloads that were received by the team before the user was a member, might be a matter of policy, and that policy may further be varied by rank. For example, new team members might be able to see payloads up to a week before they joined, but higher rank members might see the complete history of payloads sent within the team.

There is a special case of friends list 620 and forwarding that is preferably supported when a user has invited one of the contacts associated by my_contacts relation 114 to become a new user of the site. In this case, a new record in user table 110 is initialized, a record of the invitation to join message is created in message table 180, and a new record in friends table 120 links the current user to the tentative new user record. Now, the tentative new user will appear in friend list 620. However, payloads sent or forwarded by the current user to this tentative friend user will be recorded as a new record in pending_forwards table 330. This allows efficient storage and cleanup if the tentative new user does not timely accept the invitation to join, or if it turns out that the tentative new user actually accepted a different invitation to join and is now a different user that originally expected. In the case where the invitation times out or is declined, the corresponding tentative user record and the associated pending_forwards records are removed. If the tentative new user accepts the invitation and enrolls with the site, then the tentative user record is processed to become an actual user, and any associated records in pending_forwards table 330 are converted into new records in forwards table 320. In the case that the tentative new user accepted a different invitation and is already a different user, then only those records in pending_forwards table 330 for which the different user has no records in forwards table 320 with matching payload identifier fields will be converted. Afterwards, the tentative user records can be removed.

In another method for sending payloads to non-members, a user first elects to forward a payload as above. Instead of being limited to specifying existing users by selecting from friends list 620 or groups list 630, an separate field (not shown) would accept an email address to which a link to the payload (not shown) would be sent. Preferably, this method includes with the link a description of the site and an invitation to join as a member. One way to implement this method is to create a record in contacts table 116 (or refer to one already associated with the sending user if the email address would otherwise be duplicated). An invitation to join is created as described above, as is the record in pending_forwards table 330. The email received by the invitee provides a link to the payload, and preferably the invitee is permitted to view the payload and the associated comments. However, before the invitee may leave comments or forward the payload, the invitee must accept the invitation and register with the site, as described above.

As described elsewhere herein, an IM name or other communication address may be used instead of an email address throughout this invention. If a user provides one or more links in user_links table 190, any of these can be flagged as the preferred method of contact (not shown) for receiving payloads. For example, if an IM service is identified as a preferred method of contact, then the site server may utilize the presence manager of the IM service to determine when the addressee is online using the preferred service. When so detected, forwarded payloads may be forwarded as usual, plus the payload itself, or merely a link to the payload, may be sent using IM protocols to the addressee. A preference (not shown) may be recorded by a user to indicate whether payloads sent when the user is not online using the preferred server should be forwarded once the user does return to the IM service, whether a notification would be sent (which may be preferred if multiple payloads had been so backlogged), or whether no IM action should be taken for payloads sent while the user was offline with the IM service.

Similarly, a user may choose to periodically receive emails as payloads are forwarded to him, if an email address is the preferred method for receiving payloads.

Figure 8:
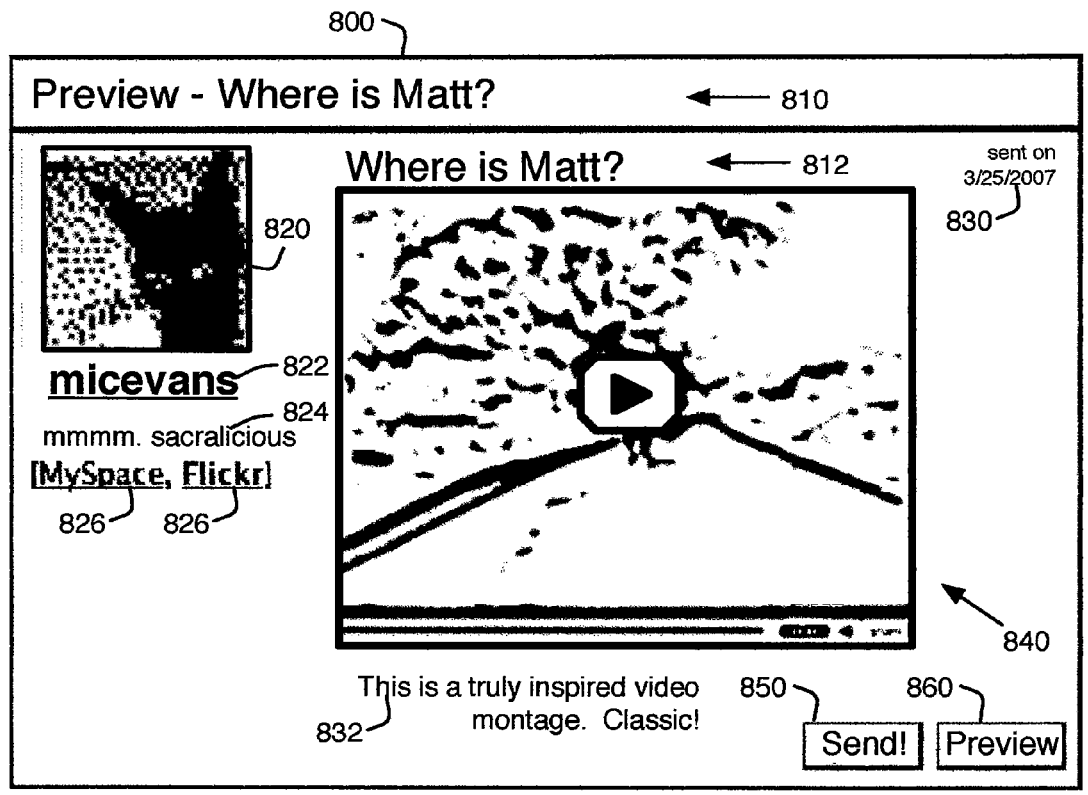
FIG. 8 is a preview of a payload.

If preview button 640 is pressed, a preview rendering 800 is displayed, as shown in FIG. 8. A preview heading 810 is shown to label the preview area below, the payload title 812, the name 822, avatar 820, motto 824, and any social site links 826 of the authoring user are displayed. An expected date of sending 830, and the rendered content 840 of the payload itself, along with any forwarding note 832. The actual payload content 840 may contain complex formatting and may include multiple images or other multimedia. Preferably, the entirety of payload creation form 600 is shown below the preview section 800 so that the user can quickly continue, modify, or correct entry of the payload, after which a pressing of preview buttons 860 or 640 will result in an updated display in preview section 800.

Once satisfied with the outcome, send button 850 or 650 will have the same result.

Figure 9:
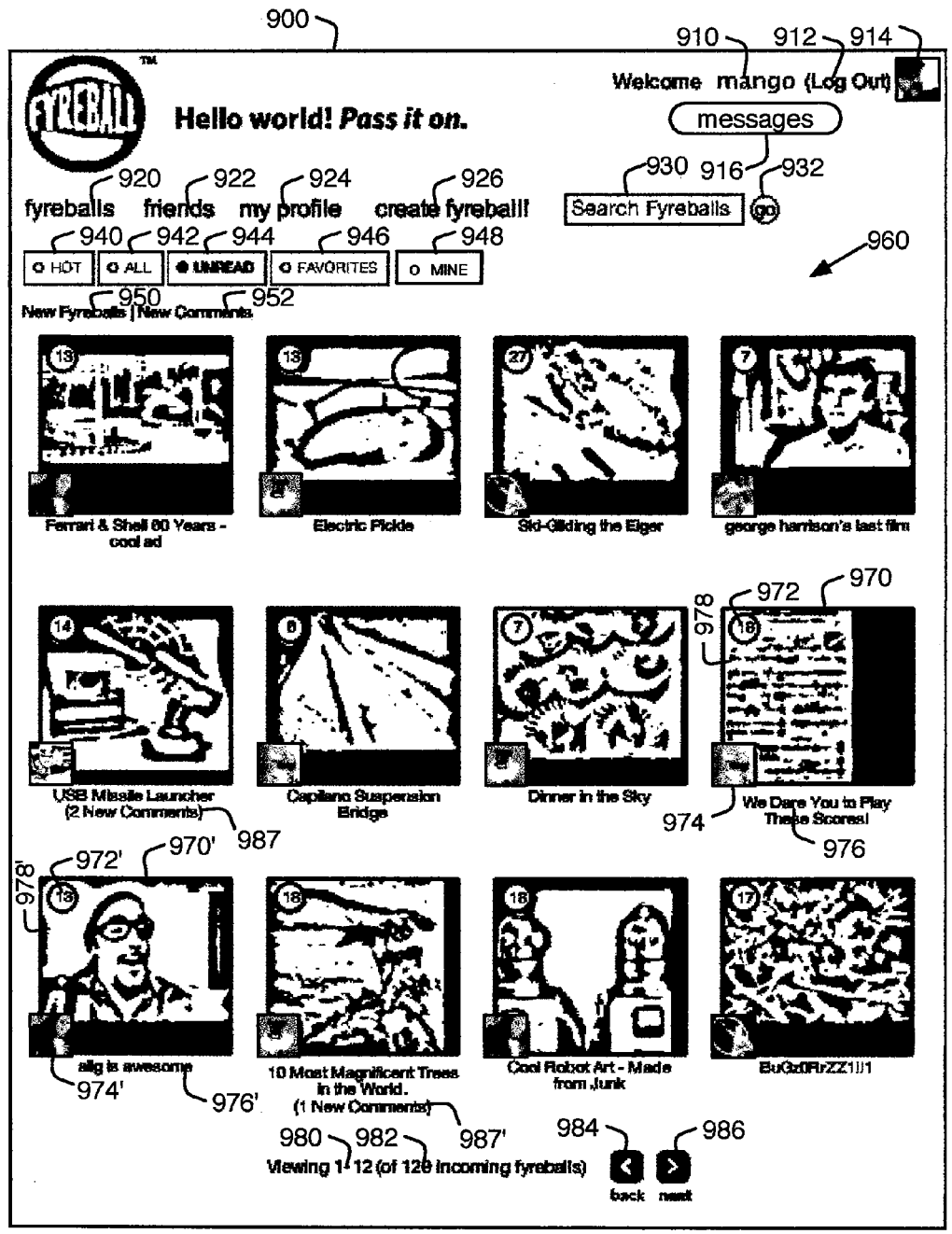
FIG. 9 is a display showing the list of payloads currently available to a user.

FIG. 9 shows an exemplary payload browsing interface 900, which shows payloads accessible to a user 910 logged into the site. The user is reminded of his avatar 914 and provided with a log out button 912 to disengage from the user account while still remaining on the site (useful if several members of a household share the same computer, but not the same user account).

A menu is provided to access functions: a profile button 924 takes a user to a page for managing the user's account, a friends button 922 takes a user to a page for adding new contacts, inviting them to join, and collected them in groups; a create payload button 926 takes the user to payload creation form 600; payloads button 920 or a search using search text 930 and start search button 932 provide a payload browser 960.

Messages button 916 is preferably highlighted if there are newly received or unanswered messages for the user tracked by records in messages table 180. However, even if no messages have been received (where msg_to in messages table 180 is the current user 910), messages button 916 remains active, as the user could choose to send a message, for example an invitation to join a team (msg_type=3), or an offer of friendship (msg_type=1) to a person-of-interest who shares a mutual admiration relationship through likes table 130 (as notified by a message of msg_type=5). In the message interface form (not shown), messages such as an offer of friendship may be automatically enabled in the case where there has been a notification of mutual admiration. Messages such as an invitation to join a team would be automatically disabled if either the user belongs to no teams, has insufficient rank in a team to invite new members, or has no friends who are not already on each team of which the user is a member. Preferably, the message interface form also displays a list of incoming messages, such as offers of friendship (msg_type=1), responses to offers of friendship (msg_types 6 & 7), responses to invitations to join a team (msg_types 8 & 9), etc.

Payload browser 960 is populated by queries against all payloads sent to a user or to a group or team of which the user is a member. Buttons are provided for the most useful queries, such as hot payload button 940 which displays payloads that have the highest popularity first, all payloads button 942 which displays most recent receipts first, unread button 944 which eliminates previously viewed payloads from the display, and favorites button 946 which displays payloads tagged by the user in the fw_favorite field of forwards table 320 as being a 'favorite' payload. A My Payloads button 948 provides display of all payloads authored by a user, by default in order of creation.

Sort order buttons can reorder the previously filtered payloads displayed. New payloads button 950 sorts the display so that the most recent payloads appear first. New comments button 952 sorts the display so that those payloads having the most recent comments are displayed first.

Payload browser display 960 is preferably an array of thumbnails 970, 970' representing each payload. A thumbnail may contain a reduced rendering of the payload display as shown in preview display 600. However, a more aesthetic display can be achieved by taking the first or largest image from the payload and providing a reduced version of the image 978, 978' to fill the thumbnail frame. In the case of a video asset, a key frame, if identified, is used as the thumbnail image, otherwise a default of the first frame or a frame selected several seconds into the sequence (in case the first frame is black). For audio-only or text-only payloads, a default icon may be provided. Alternatively, a large icon of the sending or forwarding user may be substituted.

Each payload thumbnail 970, 970' in payload browser display 960 is preferably augmented by indicators such as popularity indicator 972, 972' and sender avatar 974, 974'. If present, a forwarding note 976, 976' is displayed from the fh_text field of the corresponding record in forwards_header table 310. The number of new comments 987, 987' are displayed, being the number of comments added since the user last logged onto the system, or alternatively, since the user last looked at the payload in detail.

The number of payloads available to a user its expected to grow large. Preferably the total number of payloads selected is shown in count display 982, and the current range of that count being displayed is shown in range display 980. Navigation buttons 984 and 986 allow the user to move to the next or previous range, as desired.

Figure 10:
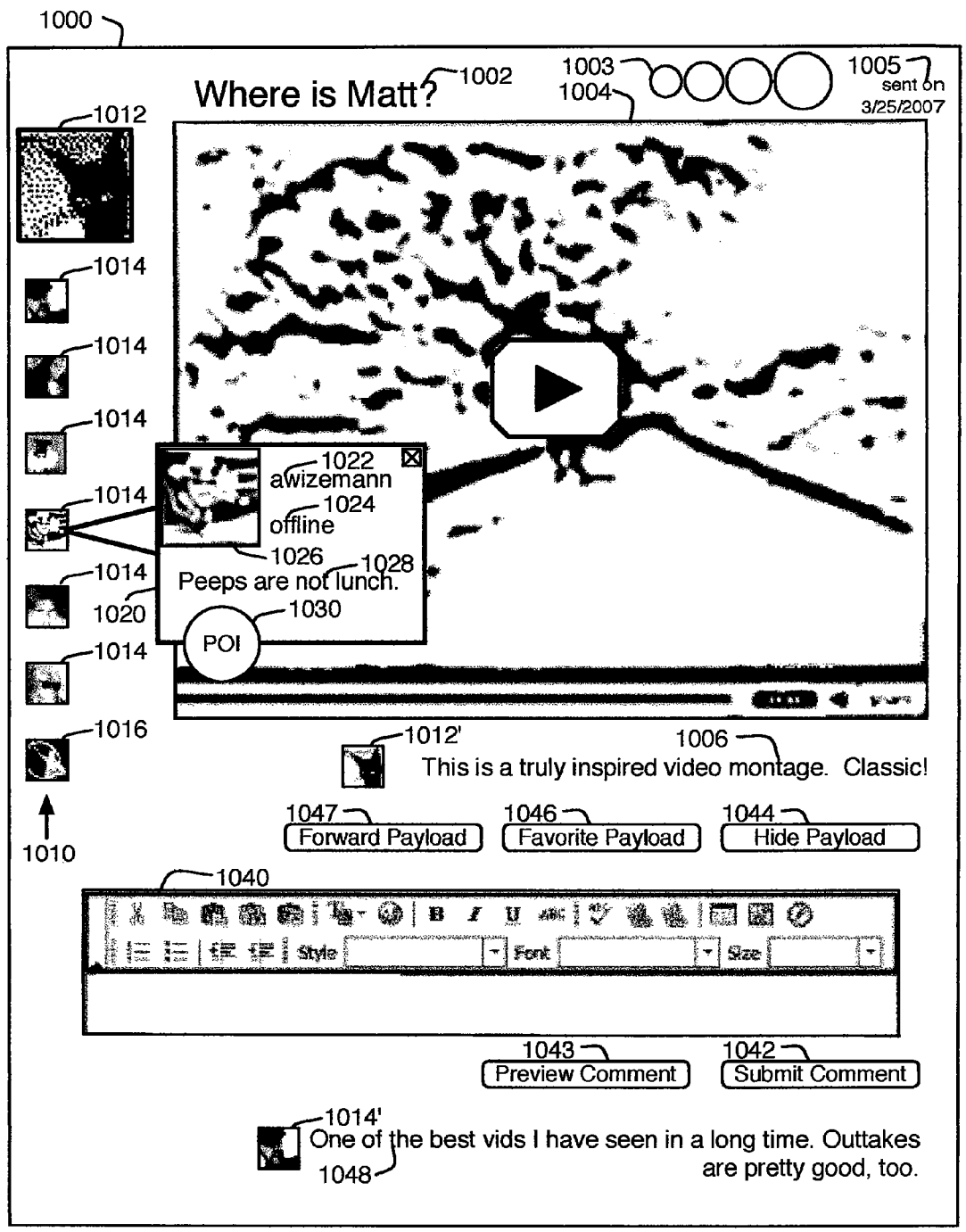
FIG. 10 is a view of individual payload details.

When any of the payload thumbnails 970, 970' are selected, a detailed view 1000 of the payload is provided, as shown in FIG. 10. The title 1002 of the payload is shown, along with the payload presentation 1004. Preferably, a score display 1003 is indicates the popularity of the payload, either numerically or preferably by indicating a degree of popularity (analogous to the music industry's gold and platinum records that represent cumulative sales of an album). The date the payload was initially sent 1005 or the date it was forwarded to the current recipient (or both dates) may be shown.

In order to promote a sense of fame within the payload authoring population, the original author of the payload can be represented with a large rendition of the author's avatar 1012. The author's avatar 1012 is the first in the direct forwarding chain 1010 which preferably includes a smaller avatar 1014 for each user from the author of the payload to the current recipient. The last avatar 1016 is that of the user who forwarded the payload to the current recipient.

In an alternative embodiment, the forwarding chain might continue to the recipient's own avatar icon. If the recipient has already forward the payload to other users, the avatars of these users (not shown) can be displayed as a generation. Each of those users may have also forwarded the payload to addition users, forming a subsequent generation, and so one. For a popular payload that is subjected to many forwards, the number of generations and unique users following the current recipient may become very large. Policy may limit how many generations or individual avatars of downstream recipients are shown.

Clicking an avatar in forwarding chain 1010 (or elsewhere, e.g. in association with comments), or preferably merely hovering over an avatar such as 1014 produces a brief profile 1020 of the corresponding user. A larger version of the user's avatar 1026, the user's username 1022 (from u_username), status 1024 (from u_status), motto 1028 (from u_motto) and, if the user is not already a friend of the recipient, a person-of-interest button 1030 for tagging the user as being liked by creating a new record in likes table 130 with a who-is-liking relation 132 established for the recipient and the who-is-liked relation 134 set for the selected user in the chain 1010. If the user of the selected avatar is already a friend of the current user, then the person-of-interest button 1030 is replaced by an icon (not shown) indicating established friendship.

Optionally, each avatar in chain 1010 may be annotated by icons or other indications (none shown) in response to the corresponding user having tagged the present payload as a favorite, or having left a comment on the payload. Similarly, if the payload is tie to a team by a record in team_payloads table 420, then the avatars in chain 1010 may be badged according to the corresponding user's rank in a team to which this payload belongs.

These and all the display options concerning the detailed display of the payload are preferably controlled with a CSS file identified by pl_theme_id forming with-theme relationship 216 for the payload.

Non-empty forwarding note 1006 is taken from fw_text in forwards table 320, preferably in the order of the forwarding chain 1010. The avatar 1012' of the user who forwarded the payload with note 1006 is also shown, and as above, the avatar responds to a mouseover or click with a brief profile. Further down the screen, other forwarding notes 1048 are shown, and identified by the corresponding user's avatar 1014'.

In an alternative embodiment, the existence of forwarding notes 1006 and 1048 may be indicated by an icon adjacent to the avatars of the corresponding users in forwarding chain 1010.

Also below the payload display 1004 is a comment entry box 1040, which functions identically to payload entry box 608. However, instead of finishing with send button 650, a leave comment button 1042 is pressed, and the comment entered and any multimedia assets are entered as new records into comments table 230 and comment_assets table 240, respectively. Each comment record is tied with co_payload_id and relation 234 to the current payload, and each comment_asset record is linked to the comment record by ca_comment_id and relation 242.

Before submitting a comment, the user may press preview comment button 1043 and view a preview of the comment similar to payload preview 800. Since the payload and the comment are both capable of containing multimedia hypertext content of equal complexity, this is sometimes an important feature. Often, however, a comment is a simple text message (akin to a forwarding note 1006 or 1048), and thus a preview would not show anything more substantial that what is already seen within the comment edit box 1040.

Comments, if associated with a payload, and if displayed, preferably appear below the payload 1004 in the detail view 1000, for example in the position of note 1048. For simple text such as note 1048, the user may have used the comment mechanism or the forward note mechanism. However, a comment would be viewable by all recipients of a payload, past, present, and future (barring team-related restrictions), whereas a forwarding note is preferably only visible to those downstream of the user adding the forwarding note in the forwarding chain 1010. In an alternative embodiment, as a matter of policy, the forwarding note may be visible only to the immediate recipients of the forwarded payload.

If the current payload is owned by a group with a record in team_payloads table 420, then the comment record is also tagged with the group identity in co_group_id to form relationship 236. In this way, comments regarding a team-owned payload made by team members can be made visible only to other team members, even after the payload is sent to users outside of the team (by a member with sufficient rank to do so). While users who are members of the team may see comments made by those outside of the team, the reverse is not true. This promotes team mystique, and is therefore cool.

Occasionally, a payload may be delivered to a recipient who is completely disinterested in the content, or perhaps the payload is exceptionally poorly produced. For whatever reason, should the recipient prefer not to be bothered by the payload, there is the hide button 1044, which will set the fw_fled flag in the corresponding record in forwards table 320 which causes the payload to be not shown for all browser displays 960, for all filters (such as provided by buttons 940, 920, 944, and 946), except those produced by search criteria 930 and perform search button 932.

Ideally, more often, the opposite is true. A payload is fantastic and the recipient wishes to tag the payload as desirable. In this case, the favorite button 1046 is used to set fw_favorite flag in the corresponding record in forwards table 320.

Forward button 1047 brings up a forwarding dialog (not shown) substantially like the lower half of payload creation form 600 including forwarding note entry box 610, friend list 620, and group list 630. Note that theme selector 612 would not be provided, as the payload theme was established by the original author.

Also note that if the payload is a team-owned payload, then forwarding button 1047 would be disabled unless the user is of sufficient rank to send the payload outside of the team according to the team policy.

Preferably, as each comment is added, each time a payload is forwarded, as the detail of each payload is viewed, with each press of the hide button 1044, corresponding fields pl_comments, pl_forwarded, pl_viewed, and pl_bounced are incremented. Similarly, viewing the details preferably sets the fw_read flag in the corresponding record in forwards table 320.

Similarly, as each comment is attached to a payload, the pl_commentdate of the corresponding payload record in payloads table 210 is set to the current date and time. This facilitates determining which payloads have comments added since the date and time of the user's last login, stored in u_lastlogin.

Alternatively, additional dates and times can be tracked (not shown), for instance, when a payload was last viewed by the current user, which since it relates to both the payload and the user would be stored in the corresponding record in forwards table 320. This would allow a display of comment counts 987 and 987' since the last time the recipient looked at the payload details.

Figure 11:
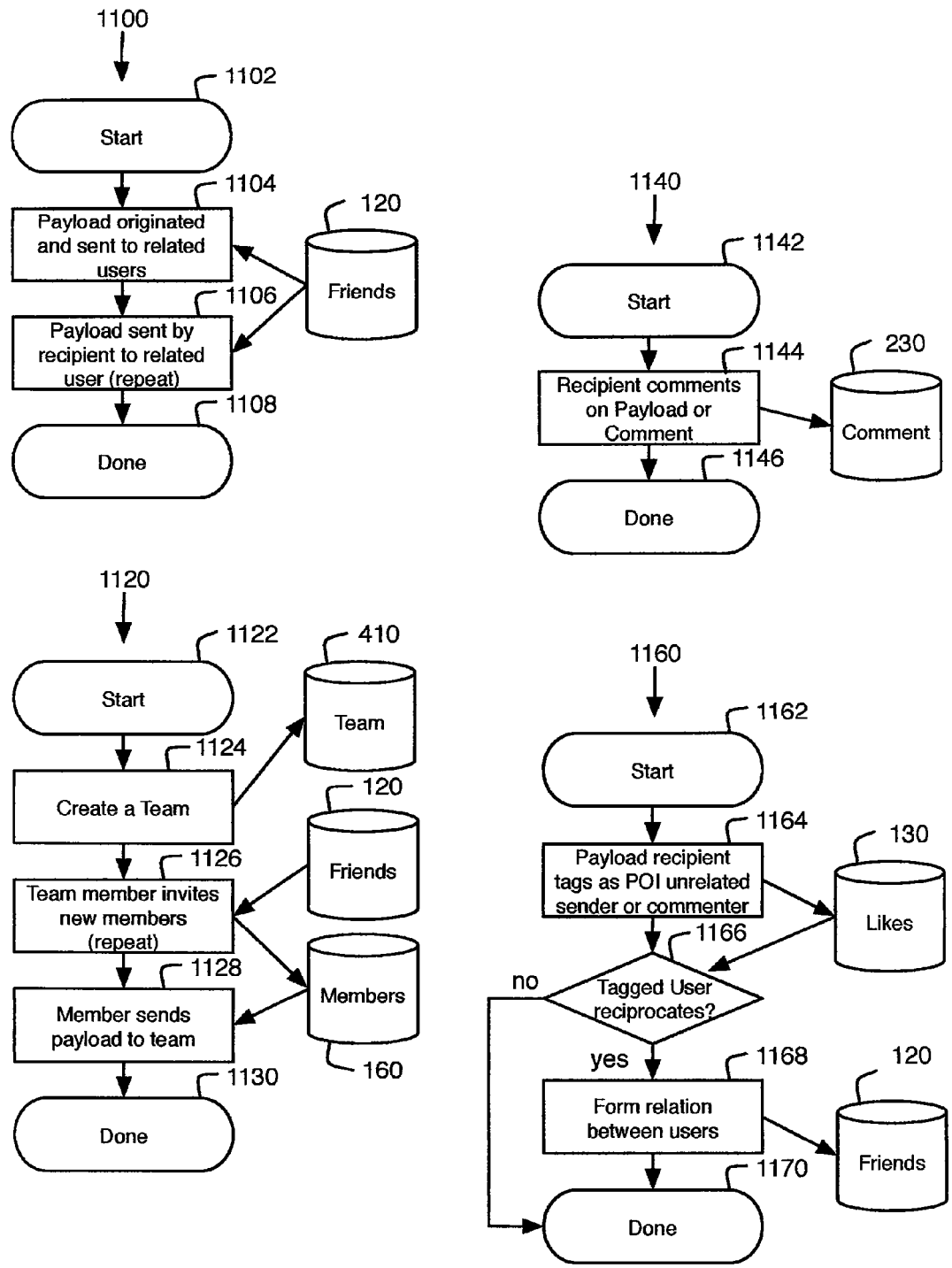
FIG. 11 shows four flowcharts of processes suitable for implementing the present invention.

Turning to FIG. 11, several processes for implementing the present invention are shown. Payload sending and forwarding process 1100 starts with step 1102, where a blank version of payload creation interface 600 is provided. In creation and sending step 1104, the payload author populates the fields of form 600, which includes a list of friends from table 120 and groups (not shown in FIG. 11) from which the author chooses the initial recipients. In forwarding step 1106, each recipient can elect to forward the payload with forward button 1047 and forward interface (not shown, but described above) to advance the payload to the recipient's friends. Step 1106 can repeat indefinitely, as each generation of recipient is able to forward the payload to any of the recipient's friends (from friends table 120) that have not yet received the payload. Further, both the author and any recipient can later send or forward the payload, respectively, to users that they did not originally select. Payload sending and forwarding process 1100 ends at step 1108, only after every user has been the recipient of a payload sending or forwarding in steps 1104 or 1106, which may actually be never. Alternatively, an implementation may place a 'sunset date' on a payload (not shown), after which it is deleted or forwarding is otherwise disallowed, which would also trigger final step 1108.

Team creation and team-owned payload creation process 1120 begins at step 1122. Preferably, a user creates a team in step 1124 by initializing a new record in teams table 410 using a team creation interface (not shown) allowing the upload of a team logo, entry of a motto, selection of a team theme, and the specification both of rank names (e.g., "President", "General", "Colonel", "Captain", "Recruit") and the ranks at which specific commands can be issued.

The creator of the new team is automatically related as a member of the team in group_members table 160, and identified in g_owner_id in groups table 150. As such, the creator is initialized at the highest rank and given the ability to edit the values in the team record in teams table 410 (except t_group_id).

In invitation step 1126, each member of the team may invite any of the member's friends (from friends table 120). Those invitees who accept are added as records to group_members table 160. The invitation step 1126 can repeat iteratively, indefinitely.

Team payload creation and sending step 1128 begins when a payload is created by a team member, and the payload is sent to all of the team members from corresponding records in table 160 (provided the creator has sufficient rank to send payloads to the team).

Commenting process 1140 begins in step 1142 with a recipient receiving a payload. In comment step 1144, the recipient adds a comment into comment edit box 1040 and submits the comment using submit comment button 1042. The resulting comment is recorded as a record in comments table 230, and the commenting process concludes in step 1146.

Social networking through content process 1160 begins in step 1162 with a user receiving a payload. In tagging step 1164, the recipient can identify another user, not already a friend, who has commented on the payload (with process 1140) or who lies in the forwarding chain 1010 of the payload to the recipient, or the downstream fanout (not shown) from forwards that stem from forwards by the recipient. Once identified, the user can be tagged as person-of-interest with POI button 1030, and the resulting directed relationship is entered as a record in likes table 130.

In step 1166 a query is made to determine if likes table 130 contains a reciprocal relationship. If so, a special message (msg_type=5) indicating the occurrence of mutual interest is sent to both involved users. According to predetermined policy, the friends relationship may be formed automatically in step 1168, with the corresponding records created in friends table 120; or the friends relationship may await the acceptance of one or both of the parties.

If the query determines that a reciprocal relationship does not exist, the social networking through content process 1160 terminates at step 1170.

In alternative embodiments, the policy may be that two or more identifications of a user with the POI button 1030 may be needed by each party before the system will provide the introduction with the special message (msg_type=5).

As with all such systems, the particular features of the user interfaces and the performance of the processes, will depend on the architecture used to implement a system of the present invention, the operating system of the servers and database selected, the bandwidth and other properties of the network selected, and the software code written. It is not necessary to describe the details of such programming to permit a person of ordinary skill in the art to implement the processes described herein, and provide code and user interfaces suitable for executing the scope of the present invention. The details of the software design and programming necessary to implement the principles of the present invention are readily understood from the description herein. Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the claims.

The invention claimed is:

1. A method for providing a social introduction comprising the steps of:
   a) providing a system for tracking a payload sent among users;
   b) sending said payload from a first user to a second user;
   c) creating a first record in said system representing the performance of step b);
   d) sending said payload from the second user to a third user;
   e) creating a second record in said system representing the performance of step d); and,
   f) introducing the first and third users with said system on the basis of the first and second records.

2. The method of claim 1 wherein introducing step f) is performed by said system in response to a selection made by one of the first and third users.

3. The method of claim 1 wherein introducing step f) is performed by said system in response to a first selection made by the first user and a second selection made by the third user.

4. A method for providing a social introduction comprising the steps of:
   a) providing a system for tracking a payload sent among users;
   b) sending said payload from a first user to at least a second user, whereby recipients of the payload comprise at least the second user and not a third user;
   c) creating a record in said system corresponding to each recipient of the payload resulting from step b)
   d) sending said payload from at least one of the recipients to at least one additional recipient;
   e) creating an additional record in said system corresponding to each additional recipient to whom the payload is sent in step d)
   f) repeating steps d) and e) at least until the recipients comprise the third user; and,
   g) introducing the first and third users by said system on the basis of the records tracking the payload from the first user to the third user.

5. The method of claim 4 wherein introducing step g) is performed by said system in response to a selection made by one of the first and third users.

6. The method of claim 4 wherein introducing step g) is performed by said system in response to a first selection by the first user and a second selection made by the third user.

7. A method for providing a social introduction comprising the steps of:
   a) providing a system for tracking payloads sent among users;
   b) sending a first payload from a first user to a third user through at least a second user;
   c) creating a first set of records in said system corresponding to each transfer of said first payload from the first user to the third user;
   d) sending a second payload from the third user to the first user through at least one selected from the second user and a fourth user;
   e) creating a second set of records in said system corresponding to each transfer of said second payload from the third user to the first user;
   f) introducing said first and third users on the basis of the first and second set of records.

8. The method of claim 7 wherein introducing step f) is performed by said system in response to a first selection by the first user, and a second selection made by the third user, said first selection being enabled by said second set of records, said second selection being enabled by said first set of records.

* * * * *